US006509060B1

(12) United States Patent
Komoda et al.

(10) Patent No.: US 6,509,060 B1
(45) **Date of Patent: *Jan. 21, 2003**

(54) METHOD FOR MANUFACTURING FILTER HAVING CERAMIC POROUS FILM AS SEPARATING FILM

(75) Inventors: Tadanori Komoda, Toyoake (JP); Makoto Ito, Handa (JP); Tatsuya Hishiki, Nagoya (JP); Masahiro Murasato, Chita (JP); Manabu Isomura, Tsushima (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/646,973

(22) PCT Filed: Jan. 31, 1999

(86) PCT No.: PCT/JP00/00522

§ 371 (c)(1), (2), (4) Date: Sep. 25, 2000

(87) PCT Pub. No.: WO00/45944

PCT Pub. Date: Aug. 10, 2000

(30) Foreign Application Priority Data

Feb. 1, 1999 (JP) ........................................ 11-024461
Mar. 29, 1999 (JP) ........................................ 11-086602

(51) Int. Cl.[7] ........................ B05D 7/00; B05D 7/22

(52) U.S. Cl. .................... 427/235; 427/238; 427/239; 427/244; 427/245; 427/247; 427/294; 427/295; 427/435; 427/443.2

(58) Field of Search ............................ 427/243, 244, 427/245, 247, 294, 295, 235, 238, 239, 435, 443.2

(56) References Cited

U.S. PATENT DOCUMENTS 4,719,058 A 1/1988 Komoda
5,194,154 A * 3/1993 Moyer et al. ............ 210/510.1
5,198,007 A * 3/1993 Moyer et al. ............ 210/510.1
5,656,220 A * 8/1997 Whittemore et al. ....... 264/623
6,077,800 A * 6/2000 Takahashi et al. ............ 501/80

FOREIGN PATENT DOCUMENTS

JP 61-238315 10/1986
JP 62-149434 7/1987
JP 63-66566 12/1988
JP 2-90927 3/1990
JP 2-126924 5/1990
JP 3-284329 12/1991
JP 8-245278 9/1996

OTHER PUBLICATIONS

English translation of JP 2–90927 A, Komoda, Mar. 1990.*

* cited by examiner

*Primary Examiner*—Shrive P. Beck
*Assistant Examiner*—Kirsten A. Crockford
(74) *Attorney, Agent, or Firm*—Burr & Brown

(57) ABSTRACT

A method for manufacturing a filter utilizing a porous ceramic membrane as a separation film is provided, comprising the steps of substituting the air inside fine-pores of the porous substrate with a liquid, isolating the porous substrate face to be provided with a separation film, the other face of the porous substrate face not provided with the separation film, continuously feeding a film deposition slurry containing ceramic framework particles to allow the slurry to contact the face of the porous substrate to be provided with the separation film, applying a differential filtration pressure between the faces of the porous substrate, and depositing the slurry on the surface of the porous substrate. An organic polymer for endowing the deposition film with filtration resistance is added to the slurry.

7 Claims, 7 Drawing Sheets

METHOD FOR MANUFACTURING FILTER HAVING CERAMIC POROUS FILM AS SEPARATING FILM

TECHNICAL FIELD

The Present invention relates to a method for manufacturing a filter utilizing a porous ceramic membrane (referred to as a porous membrane hereinafter) as a separation film. The present invention particularly relates to a method for manufacturing a filter having a uniform film thickness and smooth film face, as well as a porous membrane having a sharp micro-pore size distribution.

BACKGROUND OF THE INVENTION

Filters utilizing a ceramic porous membrane as separation films (i.e., filtration membranes) are more useful as solid-liquid separation filters when compared with filters utilizing a polymer membrane as a separation film. In addition to the advantage that the micro-pore size of the porous ceramic membrane which determines filtration ability is precisely controllable, the ceramic filter is highly reliable due to its excellent physical strength, durability, and high corrosion resistance to acids or alkalis.

The filter that has been frequently used comprises a ceramic porous membrane formed on a porous substrate. Typically, the ceramic porous membrane has a far finer pore size than the porous substrate to improve filtration performance while maintaining a given water permeation rate.

The filter described above may be manufactured according to conventional methods by depositing a slurry containing framework particles to form a film, such as a dipping method, followed by firing the deposited film. However, the inventors of the present invention have disclosed an excellent slurry deposition method—a filtration deposition method—by which film defects such as pin holes can be prevented from being generated, in Japanese Examined Patent Application Publication No. 63-66566.

In the above filtration deposition method, the face of the porous substrate to be provided with a separation film is isolated to be airtight from the face of the porous substrate not provided with the separation film in a vacuum chamber, after substituting air in the fine pores inside of the porous substrate with a liquid. Then, a film deposition slurry containing ceramic framework particles is allowed to contact the face of the porous substrate to be provided with the separation film by continuously feeding the slurry thereon, and a differential filtration pressure is applied between the face of the porous substrate to be provided with the separation film and the other face, thereby depositing a slurry film on the desired surface of the porous ceramic substrate.

In one example, a slurry is deposited on an inner wall of a through-hole of a porous substrate prepared by forming a single through-hole along the longitudinal direction of a cylinder (referred to as a tubular substrate hereinafter). As shown in FIG. 4, the inside and the outer circumference side of the through-hole of the porous substrate 1, whose fine pores are filled with a liquid, are secured with flanges 2 and 3, and bolts 5 in an apparatus comprising a vacuum chamber 6, a reservoir 8, a pump 7, the flanges 2 and 3, and a tubing 10, so that one side is isolated from the other side to be airtight.

Subsequently, the inside of the vacuum chamber 6 is evacuated with a vacuum pump 13 so that the pressure at the outer circumference side of the porous substrate 1 is reduced, while allowing a slurry 9 in the reservoir 8 to contact the inner wall 12 of the through-hole by continuously feeding the slurry into the through-hole of the porous substrate 1. A slurry film is deposited on the inner wall 12 of the through-hole of the porous substrate 1 by the operation as described above, because a differential filtration pressure is applied between the outer circumference side of the porous substrate 1 and the inner wall 12 of the through-hole, and water in the slurry is discharged as a filtrate from the outer circumference side of the porous substrate 1.

Film defects such as pin-holes may be prevented in the filtration deposition method as described above, since a pre-treatment for substituting the remaining air in the fine-pores of the porous substrate 1 is applied. Continuously feeding the slurry into the through-hole permits a deposition film having a uniform thickness and quality to be formed because framework particles in the slurry are slowly deposited. Accordingly, a better quality filter may be obtained as compared with a filter obtained by a film deposition method such as dipping.

However, the advantage of the filtration deposition method that a film with a uniform thickness and quality can be formed is apt to be offset due to the recent tendency to make the filtration area, or the filter size itself, large for the purpose of improving the filtration ability of the filter.

A first problem arises when the porous substrate is a long size tube, with a length of 50 cm or more, comprising a through-hole formed along the longitudinal direction of the cylinder.

When the length of the porous substrate is large, the film deposition proceeds more easily at the slurry feed side than at the slurry discharge side, where the film deposition hardly proceeds. As shown in FIG. 5, it was difficult to deposit the slurry in the through-hole with a uniform film thickness.

A second problem arises when a filter is manufactured comprising a plurality of through-holes provided in parallel to one another along the longitudinal direction of the cylinder (referred to as a revolver magazine type substrate hereinafter) and separation films are formed on the inner walls of the respective through-holes, in order to increase the filtration area per unit volume and enhance overall filtration performance.

When the filtration deposition method is applied to the porous revolver magazine type substrate, film deposition is easily facilitated in the through-holes located at the outer circumference side of the plural through-holes as shown in FIG. 6, whereas the films are hardly deposited in the through-holes located at or near the center of the porous substrate. Consequently, it is difficult to form slurry deposition films with a uniform film thickness in all the through-holes. Further, the slurry deposition film is formed having larger thickness at the outer circumference side of the porous substrate even in one through-hole.

Although the second problem may be partly solved by increasing the thickness of the slurry deposition film, the film thickness in all the through-holes cannot be made uniform by any means. In addition, this method is not preferable since the porous membrane formed after firing has a large film thickness, resulting in a lowering water permeation rate (or filtration ability) of the filter.

A third problem is that the surface of the porous membrane is roughened as shown in FIG. 7 irrespective of the configuration of the substrate, or the micro-pore size distribution of the porous membrane turns out to be broad.

Accordingly, it is an object of the present invention to solve the foregoing problems by providing a method for manufacturing a filter having a uniform film thickness, smooth film surface and sharp micro-pore size distribution.

SUMMARY OF THE INVENTION

The technical problems of the conventional art as described above arise from the fact that the differential pressure applied on the substrate during deposition of the filtration film varies depending on the sites on the substrate. The inventors of the present invention have found that this problem may be solved by adding an organic polymer to the film deposition slurry to endow the deposition film layer with filtration resistance.

In one aspect, the present invention provides a method for manufacturing a filter utilizing a porous ceramic membrane as a separation film comprising the steps of substituting the air inside the fine-pores of the porous substrate with a liquid, isolating the face of the porous substrate face to be provided with a separation film from the other face of the porous substrate on which a separation film is not provided so as to enable a pressure differential therebetween, continuously feeding a film deposition slurry containing ceramic framework particles into contact with the face of the porous substrate to be provided with the separation film, applying a differential filtration pressure between the face of the porous substrate to be provided with the separation film and the other face of the porous substrate, and depositing the slurry on the desired face of the porous substrate, wherein an organic polymer for endowing the deposition film layer with filtration resistance is added to the slurry.

Preferably, the method uses a cylindrical porous substrate containing a single or a plurality of through-holes formed along the longitudinal direction of the cylinder, and comprises the steps of isolating the inner side of the through-holes of the porous substrate from the outer circumference side of the porous substrate to enable a pressure differential therebetween, continuously feeding the film deposition slurry into the through-holes to allow the slurry to contact the inner walls of the through-holes, applying a differential filtration pressure between the inner side of the through-holes of the porous substrate and the outer circumference side of the porous substrate, and depositing the slurry on the inner walls of the through-holes of the porous substrate.

BRIEF DESCRIPTION OF THE DRAWINGS

FIG. 1(*b*) shows a filter according to the Comparative Example 5-3.

DETAILED DESCRIPTION OF THE INVENTION

Figure 1:
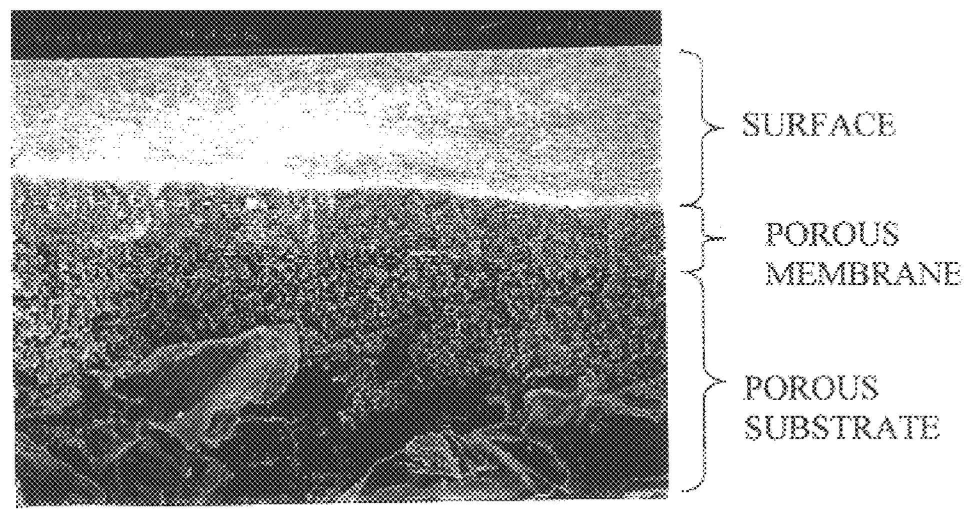
FIGS. 1(*a*)(*b*) are photographs showing the particle distribution structure in the vicinity of the surface of the ceramic filter, FIG. 1(*a*) shows a filter according to the Example 5-6.
Figure 1:
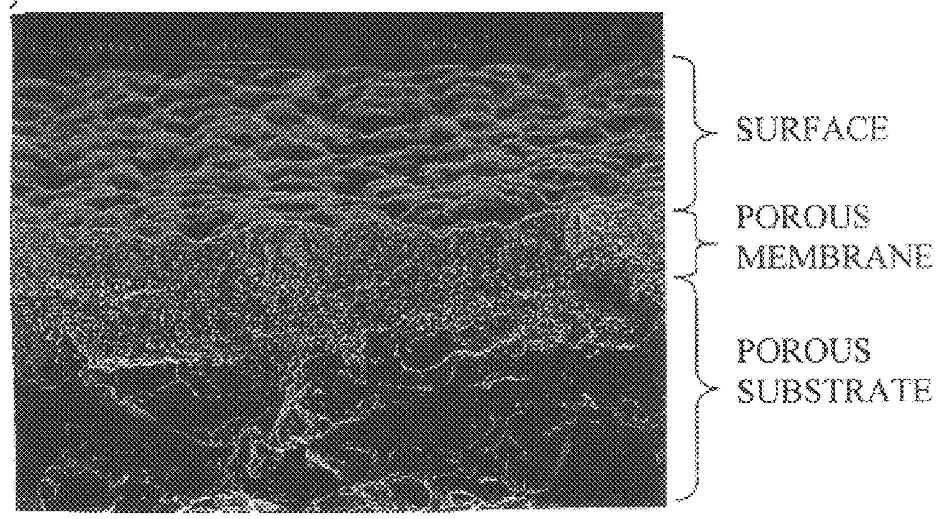

In the method for manufacturing a filter according to the present invention, an organic polymer for endowing the film deposition layer with filtration resistance is added to the slurry in the filtration film deposition step for allowing the slurry to deposit on the porous substrate as a film.

According to the present invention, it is possible to form a porous membrane having a uniform film thickness and smooth film surface as well as a sharp micro-pore size distribution.

The method for manufacturing a filter according to the present invention is described in detail hereinafter.

The terms of “fine (or micro) pore size” and “particle size” as used herein refers to “mean fine (or micro) pore size” and “mean particle size”, respectively.

The term “porous substrate” (referred to as “substrate” hereinafter) refers to a porous body having a number of fine pores with a relatively large pore size in a range of 0.05 to 50 μm, and a porous membrane having a finer micro-pore size may be formed on the porous body.

The material of the substrate is not particularly restricted so long as the substrate comprises a porous material, and either a ceramic or a metal may be used. However, ceramics are preferable in view of durability, and alumina, titania, mullite, zirconia, or a mixture thereof may be advantageously used.

The configuration of the substrate is not particularly restricted in the present invention, and the substrate may be a plate. However, the method of the present invention may be particularly advantageous when the film is formed by deposition of a slurry on the inner wall of a tubular substrate having a length of 50 cm or more, or on the inner walls of the through-holes of a revolver magazine type substrate.

The term “film deposition slurry” according to the present invention refers to a slurry for forming a ceramic porous membrane as a separation film by firing on the surface of the substrate, and contains ceramic framework particles.

The term “framework particles” as used in the present invention refers to the particles that form a framework of the porous membrane, and the micro-pore size of the porous membrane, or the function of the filter, is determined by the particle size of the framework particles.

In other words, a porous membrane having a desired micro-pore size may be obtained by appropriately selecting the particle size of the framework particles. The framework particles having a relatively small particles size in a range of 0.1 to 10 μm are used herein since the object of the present invention is to form a porous membrane having a micro-pore size of 0.05 to 1 μm.

The composition of the framework particles is not particularly restricted, so long as the particles comprise a ceramic such as alumina, titania, mullite, zirconia silica, spinel, or a mixture thereof.

The preferable concentration of the framework particles in the slurry is usually adjusted to 0.5 to 40% by weight, although it depends on the desired thickness of the deposition film. When the concentration is less than 0.5% by weight, film deposition will take a long period of time, whereas when the concentration exceeds 40% by weight, the framework particles are aggregated and liable to generate defects on the porous membrane. A dispersing agent, a crack preventing agent for preventing cracks from generating in the dried deposition film, and other additives may be purposely added.

The film deposition slurry according to the present invention may contain binders such as a ceramic or a compound that is converted into a ceramic by heat treatment (such a slurry is referred to as a low temperature firing slurry hereinafter).

The binder as described above permits a high strength porous membrane to be formed even by firing at a temperature of 300 to 700° C., where the framework particles do not form a neck among them, because upon firing, the binder forms tight bonds among the fine particles or among the fine particles and the framework particles.

The term “fine particles” as used in the present invention refers to ceramic particles having a particle size of within a range of 5 nm to 100 nm, examples of which include ceramic sol particles and ceramic fine powder particles (referred to as sol particles and fine powder particles, respectively, hereinafter). However, it is difficult to form a high quality porous membrane using particles having a particle size of 5 nm or less due to aggregation of these fine particles. On the other hand, it is also difficult to obtain a tight bonding among the framework particles having a particle size of more than 100 nm because the bonding force among the particles is weak.

A compound that is converted into a ceramic by heat treatment (referred to as a precursor hereinafter) includes, for example, zirconium oxychloride and titanium tetrachloride. The precursor can exert the same effect as the ceramic fine particles, because it is oxidized by firing at 300 to 700° C. in the air and is converted into a ceramic.

While the kind of the ceramic derived from the binder is not particularly restricted, it is preferable to use a composition containing 50% by weight or more of titania or zirconia as a principal component to improve corrosion resistance of the binding portions, which are more liable to be corroded as compared with the framework particles. A much higher alkali resistance may be secured by using a composition containing 80% by weight or more of the principal component.

While the sol particles and the fine particles may be prepared in the laboratory, a commercially available sol solution with a solid fraction concentration of 5 to 40%, including a hydrolysate of titanium isopropoxide such as TR-20A (trade name; made by Nissan Chemical Industries, Co.), or fine powder particles such as Nano Tek $TiO_2$ (trade name; made by C.I. Chemicals, Co.) may be used.

The film deposition slurry as described above is deposited on the surface of the substrate by the filtration deposition method according to the manufacturing method of the present invention.

A pre-treatment for allowing the air in the fine pores of the porous substrate to be substituted with a liquid is first applied in the filtration deposition method, because air remaining in the fine pores causes film defects, such as pin holes, during film deposition.

While the substrate may be allowed to vibrate by immersing it in a liquid to remove the remaining air, it is more securely removed by immersing the substrate in a liquid followed by heating (boiling) or evacuating the liquid. Water is a preferable substitution liquid, since water is used for the solvent of the slurry and is easy to handle.

After subjecting the substrate to the foregoing treatment, the film deposition slurry is continuously fed to allow it to contact the face of the porous substrate to be provided with the separation film, after first isolating that face from the face of the porous substrate not provided with the separation film.

Continuously feeding the slurry permits deposition of a film having a uniform thickness without heterogeneous deposition of the framework particles in the slurry.

The terms "the face of the porous substrate to be provided with the separation film" and "the face of the porous substrate not provided with the separation film" refer to the top face and bottom face in a plate type substrate, respectively, or the inner wall of the through-hole and outer circumference face of a tubular or revolver magazine type substrate, respectively, and the definition depends on the configuration of the substrate.

In addition, while the slurry is continuously fed on the face to be provided with the separation film, a differential pressure is applied between the side to be provided with the separation film and the side not provided with the separation film in the present invention.

Actually, the pressure at the side not provided with the separation film is reduced, and/or the pressure at the side provided with the separation film is increased.

Applying a differential filtration pressure allows the liquid within the fine pores of the substrate to be discharged from the side not provided with the separation film, while depositing a slurry film on the face of the porous substrate to be provided with the separation film. The membrane is finally dehydrated under reduced pressure after discharging the remaining slurry by stopping the slurry feed. The dehydration time ranges from 1 minute to 1 hour, depending on the nature of the slurry.

Figure 5:
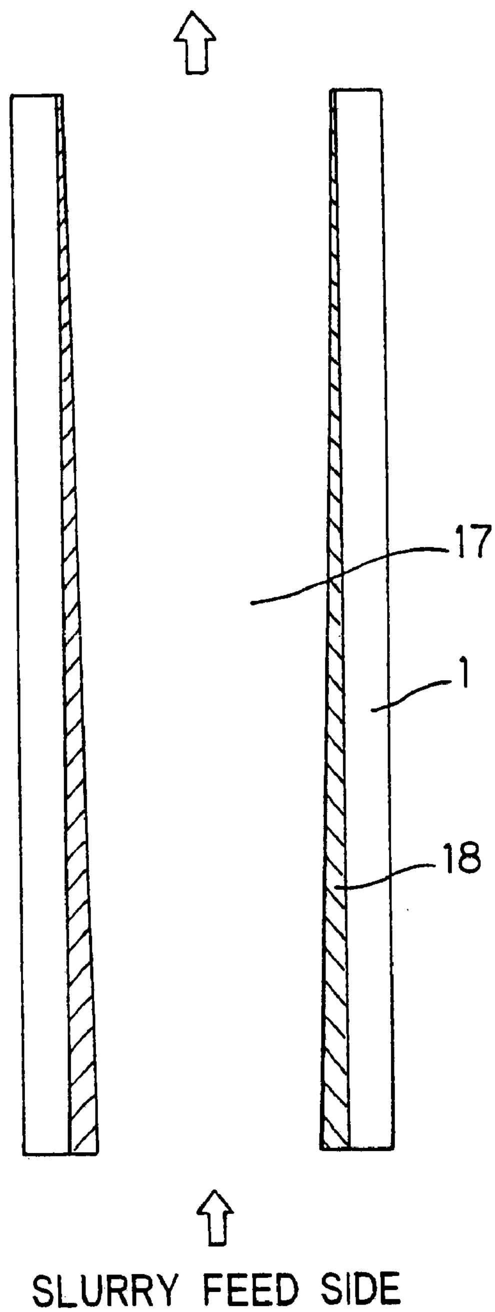
FIG. 5 illustrates the deposition film by a conventional filtration deposition method.
Figure 6:
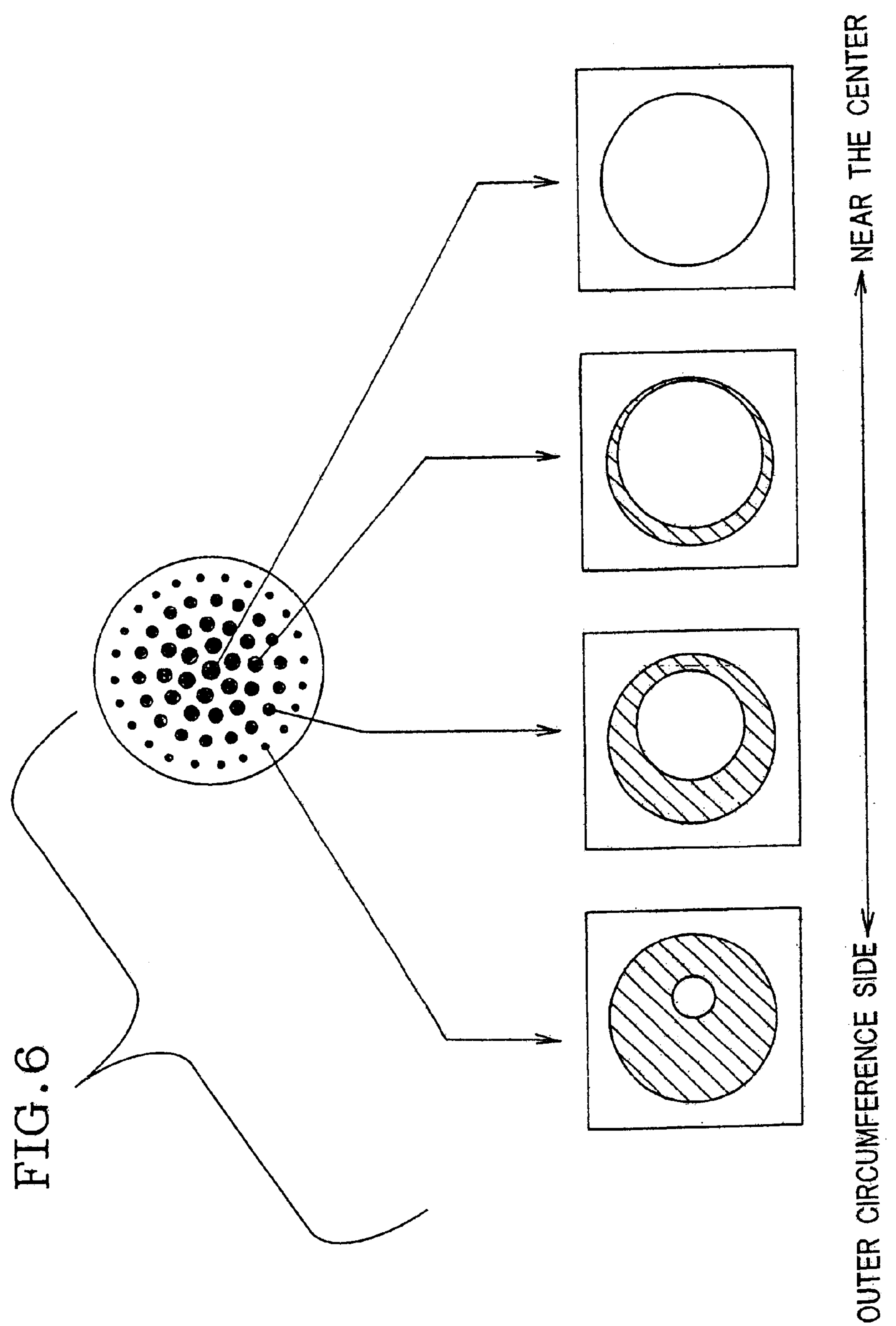
FIG. 6 illustrates the deposition film by an another conventional filtration deposition method.
Figure 7:
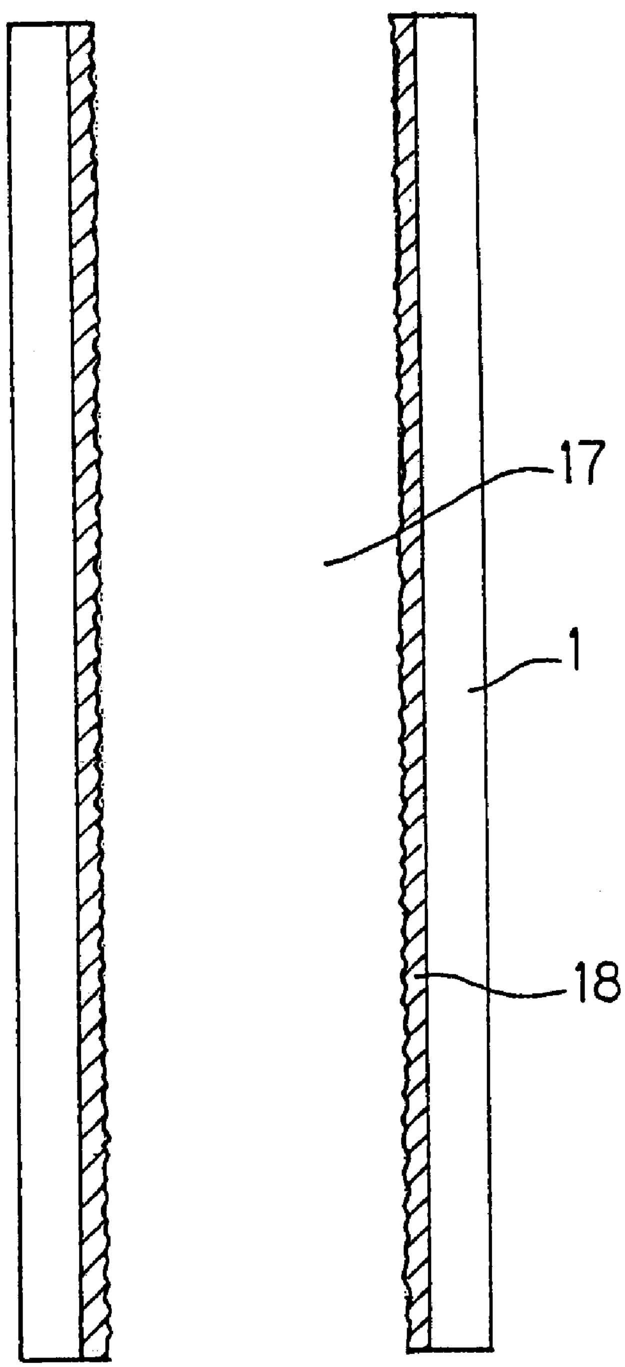
FIG. 7 illustrates the deposition film by a different conventional filtration deposition method.

However, the conventional filtration deposition method involved problems. First, the film is more readily deposited at the slurry feed side end of the substrate and hardly deposited at the slurry discharge side end of the substrate, when the film is deposited on the inner wall of a long size through-hole (FIG. 5). Second, when the film is deposited on the inner wall of the through-holes of a revolver magazine type substrate (FIG. 6), the film is more readily deposited in the through holes at the outer circumference side and hardly deposited in the through-holes at or near the center of the substrate. Third, a high quality porous membrane cannot be obtained sometimes because the surface of the deposited porous membrane turns out to be rough (FIG. 7), and the porous membrane may have a broad micro-pore size distribution.

The inventors of the present invention have studied the phenomena described above in detail, and found it to be caused by varying differential filtration pressures at respective sites on the substrate during deposition of the filtration membrane which causes the thickness of the deposition film to vary.

Taking the revolver magazine type substrate as an example, film deposition proceeds easily in the through-holes in the vicinity of the evacuated outer circumference side of the substrate due to the small pressure loss and the large differential pressure. On the contrary, film deposition hardly proceeds in the through-holes at or near the center of the substrate, since the pressure loss is large and the differential pressure is small. The other phenomena described above is conjectured to occur for similar reasons.

According to the present invention, an organic polymer is added to the film deposition slurry and the resistance for allowing a solvent to permeate through the film deposition layer is considerably increased over that of the substrate by thusly endowing the deposition film layer with a filtration resistance. Accordingly, more uniform differential filtration pressure is applied over the entire surface of the substrate to be provided with the separation film, irrespective of the difference of the pressure loss in the substrate.

The filtration resistant agent endows the film deposition layer with filtration resistance during deposition of slurry film. However, the agent should be a material that does not plug the micro-pores of the porous membrane and the fine pores of the substrate after forming the porous membrane by firing, and the agent should be an organic polymer.

Long-chain molecules like organic polymers are preferable in that they readily stay within the substrate and the film deposition layer to further increase the filtration resistance.

The materials for the filtration resistant agent include synthetic polymers as well as natural polymers such as gelatin, starch and chitosan, welan gum, agar and a mixture thereof. Further, an acrylic resin may be advantageously used among them. Welan gum and agar are preferable in that even a minute addition thereof increases the filtration resistance, because they act as if they were larger molecules by forming molecular networks.

Welan gum is a kind of natural polysaccharide having repeating units comprising either (1) two molecules of glucose, two molecules of rhamnose and one molecules of glucuronic acid, or (2) two molecules of glucose, one molecules of rhamnose, one molecule of mannose and one molecule of glucuronic acid.

The term "mixture" as used in the present invention refers to a mixture containing 1% by weight or more of agar or welan gum. While the substances to be mixed with welan gum and agar are not particularly restricted, saccharides such as monosaccharides (for example glucose) and oligosaccharide as well as other polymers such as polyvinyl alcohol, acrylic resins and polyethylene glycol may be used.

The filtration resistant agent should also be chemically stable under an acidic condition when the film deposition slurry is used for firing at a low temperature, because the slurry fired at a low temperature is strongly acidic having a pH vale of 2 or below.

For example, when the binder comprises ceramic sol particles, the slurry should be maintained in an acidic solution in order to permit the sol particles to be securely dispersed. The solution is acidified by generating hydrochloric acid from zirconium oxychloride and titanium tetrachloride as precursors as shown in the following reaction formulae:

$$ZrOCl_2+H_2O=ZrO_2+2HCl \quad (1)$$

$$TiCl_4+2H_2O=TiO_2+4HCl \quad (2)$$

Also, the filtration resistant agent should not inhibit the function of the binder, because adding the filtration resistant agent may sometimes weaken the strength of the porous membrane formed depending on the kind of the filtration resistant agent.

Examples of the filtration resistant agents that satisfy the conditions above include welan gum, agar and mixtures thereof. These filtration resistant agents are preferably used in a wide composition range of the slurry. Welan gum is particularly preferable among them since it has a high acid resistance and persists in the slurry for a long period of time.

The filtration resistant agent may be an acrylic resin when the binder is titania sol particles. However, the method for preparing the slurry is a problem in this case because, the titania sol particles and the acrylic resin form a network of irreversibly aggregated particles when the acrylic resin is added all at once to a slurry containing the framework particles and titania sol particles.

A film deposition slurry is prepared in the case described above by adding acrylic resin dropwise into an aqueous solution of the titania sol particles with mixing, followed by adding the slurry containing the framework particles dropwise into the mixed solution obtained with mixing. This preparation method permits a film deposition slurry to be prepared without forming a network of irreversibly aggregated particles between the titania sol and the acrylic resin.

It has been a problem that sufficient adhesive strength between the film membrane and the porous substrate cannot be obtained without adding a large quantity of the binder when the film deposition slurry for firing at a low temperature is deposited by filtration. This is because the binder is discharged together with the filtrate by suction of the film deposition slurry under a reduced pressure, leaving insufficient binder to enhance the adhesive strength. However, the amount of the binder added in the slurry may be reduced in the present invention since the binder more readily stays in the deposited film layer by adding the filtration resistant agent.

According to the method of the present invention, it is also possible to control the thickness of the slurry deposition film by adjusting the weight ratio between the framework particles and the filtration resistant agent, or by adjusting the ratio between the slurry feed rate and the differential filtration pressure. This is because there is a maximum thickness (referred to as a "critical thickness" hereinafter) which is controllable by the foregoing factors, even in the filtration deposition method when the film deposition step is continued for depositing slurry supplemented with the filtration resistant agent.

The presence of the critical film thickness is attributable to be due to the following conditions. The pressure loss in the deposition film layer is increased when the deposition film is thickened after substantial deposition of the slurry, thereby gradually weakening the force attracting the framework particles to the side of the face for depositing the film.

A force for scratching the surface of the deposition film layer off ascribed to the shear force of the continuously fed slurry is constant on the deposition film face. Accordingly, the film thickness turns out to be constant when the force for attracting the framework particles onto the film deposition face side is in equilibrium with the force for scratching the surface of the deposition film layer, inhibiting additional growth of the deposition film.

When the mechanism as described above is valid, it is possible to control the critical film thickness by the differential filtration pressure that determines the force for attracting the framework particles in the slurry onto the deposition film face side, and by the slurry feed rate that determined the force for scratching the surface of the deposition film layer.

The larger ratio, or the smaller ratio, between the differential filtration pressure and the slurry feed rate makes the critical film thickness larger or smaller, respectively, when the slurry composition is fixed.

The term "slurry feed rate" used in the present invention refers to the rate at which the slurry travels on the deposition film face (the rate is referred to as a "linear film surface velocity"), and does not mean the feed rate of the pump.

Since the force for scratching the surface of the deposition film is actually determined by the rate at which the slurry travels on the deposition film face, the force for scratching the surface of the deposition film increases by reducing the diameter of the through-hole of the substrate, even when the discharge rate of the pump is constant.

The critical film thickness is conjectured to be affected by the magnitude of the filtration resistance applied on the deposition film layer, because large filtration resistance weakens the force for attracting the framework particles in the slurry onto the film deposition face side. Accordingly, the critical film thickness is controllable by the weight ratio between the framework particles in the slurry and the filtration resistant agent that determined the filtration resistance. In other words, the critical film thickness is increased as the weight ratio between the framework particles and the filtration resistant agent is increased. And on the contrary, the critical film thickness is reduced as the weight ratio between the framework particles and the filtration resistant agent is reduced, while the film deposition conditions such as the differential filtration pressure and the slurry feed rate are kept constant.

According to the method of the present invention, a filter having a porous membrane of a desired thickness can be manufactured by appropriately setting the slurry deposition conditions and slurry compositions, in addition to making the film thickness uniform.

Since the manufacturing method described above is able to make the porous membrane thin while keeping uniformity of the film thickness, it is quite useful for easily manufacturing a filter having a large water permeation rate (or a high treatment performance) while maintaining its filtration ability.

It is preferable that the slurry is deposited up to the critical film thickness in the through-holes at or near the center or at the slurry discharge end of the through-hole of the tubular substrate or the revolver magazine type substrate using a method that enables a uniform film thickness, although these sites have been hardly endowed with the filtration resistance.

However, it is not always necessary to deposit the film up to the critical thickness because a film deposition thickness of 50% or more of the critical thickness can exert the effect of the uniform film thickness.

The substrate surface on which the slurry containing the ceramic framework particles has been deposited (referred to as a film deposition substrate hereinafter) is formed as described above. The filter comprising a porous membrane with a film thickness in a range of 1 μm to 300 μm and micro-pore size in a range of 0.05 to 1 μm on the surface of the film deposition substrate is manufactured by firing the film deposition substrate at a temperature as high as 1400° C. (referred to as a high temperature firing method hereinafter).

The film deposition substrate on which the low temperature firing slurry containing the binder has been deposited may be fired at a temperature of 300 to 700° C. in the air (referred to as a low temperature firing method hereinafter). When the firing temperature is lower than 300° C., strong bonds cannot be formed among the framework particles. Although bonding among the framework particles strengthens when the firing temperature is above 700° C., a large amount of energy and fireproof facilities are required, resulting in an increased manufacturing cost.

While the heat treatment conditions other than the temperature are not particularly restricted in either of the above two methods, a tunnel furnace that is suitable for mass-production is preferably used.

While the manufacturing methods according to the present invention will be described in more detail in the examples, the present invention is by no means restricted to these examples.

The porous substrate, film deposition slurry, the film deposition method and the firing method will be described below.

(1) Porous Substrate

Three kinds of the porous substrates (referred to as a substrate hereinafter) described below were appropriately selected for use. All of the substrates were subjected to a pre-treatment by which the air in the fine-pores of the substrate was substituted with water by immersion for more than three hours under a reduced pressure of 0.1 atm or below.

1. Substrate A: alumina with a tubular and cylindrical shape (outer diameter, 10 mm; inner diameter, 7 mm; length, 1000 mm), mean fine pore diameter: 10 μm (measured by a pressurized injection method of mercury)
2. Substrate B: prepared by depositing an alumina porous membrane on the inner wall face of the through-hole; thickness of the porous membrane: 150 μm; mean micro-pore size of the porous membrane: 0.8 μm (measured by an air-flow method)
3. Substrate C: prepared by depositing an alumina porous membrane on the inner wall face of the through-hole of the cylindrical revolver magazine type alumina substrate (inner diameter, 30 mm; length, 1100 mm; 61 through-holes with a diameter of 2.5 mm), mean fine-pore size of the substrate: 10 μm (measured by a pressurized injection method of mercury), mean micro-pore size of the porous membrane: 0.5 μm (measured by a pressurized injection method of mercury)

(2) Film Deposition Slurry

The film deposition slurry (referred to as a slurry hereinafter) was deposited on the substrate after a vacuum degassing treatment for removing air bubbles in the slurry.

(3) Film Deposition Method

Figure 4:
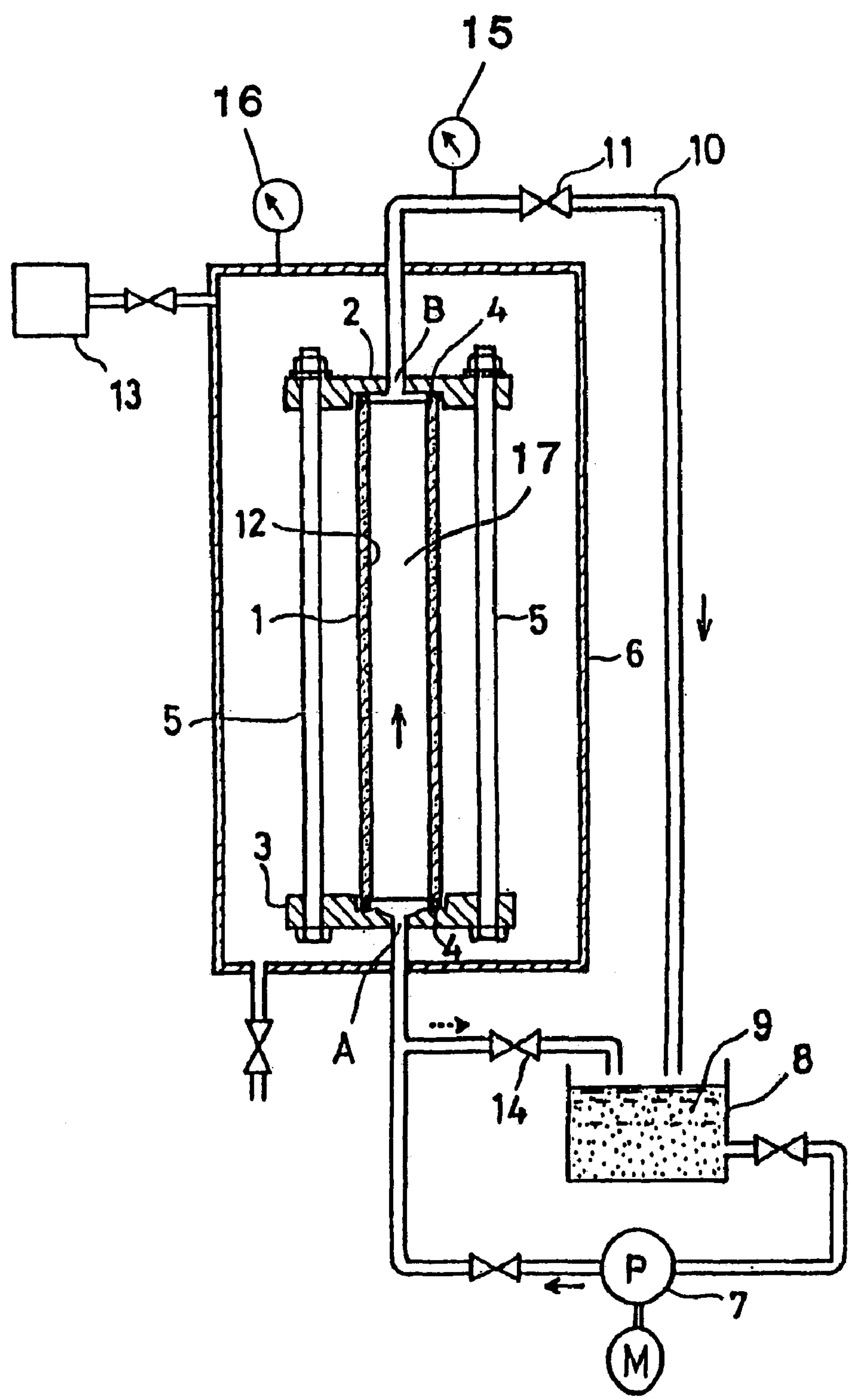
FIG. 4 illustrates the apparatus to be used for the filtration deposition method.

The filtration membrane was prepared using a filtration deposition apparatus comprising a vacuum chamber 6, a reservoir 8, a slurry pump 7, flanges 2 and 3, and a tubing 10 as shown in FIG. 4.

After fixing the two opening ends of the through-hole 17 of the substrate 1 with O-rings 4, the flanges 2 and 3, and bolts 5 so that the outer circumference side of the substrate 1 is sealed to be airtight from the inside of the through-hole 17, the slurry 9 in the reservoir 8 was continuously fed into the through-hole 17 for 30 minutes with the slurry pump 7 at a feed pressure of 2 kg/cm$^2$.

The slurry 9 which is not deposited on the substrate 1 passes through the through-hole 17 and is recycled to the reservoir 8 through the tubing 10.

The slurry in the through-hole 17 was deposited by sucking it from the outer circumference side of the substrate 1, wherein a differential filtration pressure was applied between the outer circumference side of the substrate 1 and the inside of the through-hole 17 by evacuating the inside of the vacuum chamber 6 at a reduced pressure of 0.1 atm or below while continuously feeding the slurry 9. The differential filtration pressure in this case corresponds to the differential pressure between the pressure of the slurry 9 in the through-hole 17 indicated by a pressure gauge 15 and the atmospheric pressure in the vacuum chamber 6 indicated by a pressure gauge 16.

After completing film deposition, the excess slurry in the through-hole 17 was discharged, and the micro-pores of the deposition film layer and the fine pores of the substrate were dehydrated under a reduced pressure by continuously evacuating at a reduced pressure of 0.1 atm or below, followed by drying at 110° C. to form a film deposition substrate.

(4) Firing Method

Firing was performed in all examples using an electric furnace for use in the air.

Aron AS-7503 (trade name) made by Toa Synthetic Chemicals, Co. was used as the acrylic resin listed in the tables.

Aron AS-7503 (trade name) is an auqa-sol type acrylic resin comprising a W/W type emulsion formed by a graft-polymerization of an acrylic monomer in an aqueous solution of a water-soluble polymer such as polyethylene glycol.

The agar preparation refers to a mixture comprising 60% by weight of agar with a balance of glucose, the welan gum/PVA refers to a mixture comprising 10% by weight of welan gum and 90% by weight of polyvinyl alcohol, and the agar/acrylic refers to a mixture comprising 37% by weight of agar and 63% by weight of Aron AS-7503 (trade name).

EXAMPLE 1

The effect of making the film thickness uniform using the filtration resistant agent was tested in Example 1.

The film deposition slurry listed in Table 1 was prepared by adding the framework particles into an aqueous solution of the filtration resistant agent with mixing. The concentration of the framework particles in the slurry was 17% by weight. The substrate A was used in this example. The film was deposited at a linear film surface velocity of 0.13 ml/sec with a differential filtration pressure of 1 kgf/cm$^2$. The firing temperature was 1400° C. and the firing time was one hour.

Uniformity of the film thickness was assessed from the mean values and standard deviation of the measured values obtained from 10 sites each of the film, wherein cross sections of the porous membrane at both terminal portions along the longitudinal direction, and at near the center of the filter were photographed under a scanning type electron microscope.

The film having a film thickness standard deviation falling within 20% was evaluated as good, and the film having a film thickness standard deviation exceeding 20% was considered unsuccessful and evaluated as poor.

TABLE 1

| | COMPOSITION OF SLURRY FOR FILM DEPOSITION | | | | EVALUATION OF FILTER | | |
|---|---|---|---|---|---|---|---|
| | FRAMEWORK PARTICLE | DIAMETER OF FRAMEWORK PARTICLE μM | FILTRATION RESISTIVE AGENT | FRAMEWORK/ RESISTIVE AGENT RATIO WT/WT | MEAN FILM THICKNESS μM | STANDARD DEVIATION % | UNIFORMITY OF FILM THICKNESS |
| COMPARATIVE EXAMPLE 1-1 | ALUMINA | 8 | — | — | 200 | 75 | POOR |
| EXAMPLE 1-1 | ALUMINA | 8 | WELAN GUM | 70 | 250 | 10 | GOOD |
| EXAMPLE 1-2 | ALUMINA | 3 | WELAN GUM | 10 | 50 | 8 | GOOD |
| EXAMPLE 1-3 | MULLITE | 3 | AGAR | 50 | 190 | 11 | GOOD |
| EXAMPLE 1-4 | ALUMINA | 2 | AGAR PREPARATION | 50 | 180 | 8 | GOOD |
| EXAMPLE 1-5 | ALUMINA | 1 | ACRYLIC RESIN | 70 | 150 | 20 | GOOD |
| EXAMPLE 1-6 | ZIRCONIA | 3 | GELATIN | 80 | 200 | 15 | GOOD |
| EXAMPLE 1-7 | MULLITE | 2 | POTATO STARCH | 50 | 200 | 15 | GOOD |
| EXAMPLE 1-8 | ALUMINA | 8 | WELAN GUM/PVA | 15 | 200 | 10 | GOOD |
| EXAMPLE 1-9 | ALUMINA | 8 | AGR/ACRYLIC | 100 | 300 | 15 | GOOD |
| COMPARATIVE EXAMPLE 1-2 | ALUMINA | 3 | GLYCERINE | 10 | 200 | 55 | POOR |
| COMPARATIVE EXAMPLE 1-3 | ALUMINA | 3 | ETHYLENE GLYCOL | 10 | 200 | 65 | POOR |

(Results)

As shown in Table 1, the standard deviation of the film thickness was 75% when no filtration resistive agent had not been added, and a porous membrane with a uniform thickness could not be formed (Comparative Example 1-1). Glycerin and ethylene glycol failed to form a porous membrane with a uniform thickness even when they were added in an amount with as large a ratio between the additives and the framework particles as 10. Also, the additives did not function as filtration resistive agents (Comparative Examples 1-2 and 1-3).

On the other hand, when welan gum, agar, an agar preparation, an acrylic resin, gelatin, potato starch, welan gum/PVA or agar/acrylic resin was added in the slurry as shown in Examples 1-1 to 1-7, porous membranes with a uniform thickness could be formed and the additives showed good filtration resistive characteristics. Welan gum, agar, the agar preparation and welan gum/PVA gave particularly good results, in that film deposition was possible without any appreciable distribution of the film thickness.

EXAMPLE 2

The effects of the film deposition slurry composition and the film deposition conditions for controlling the film thickness were investigated in Example 2. The film deposition slurry was prepared by adding the framework particles into an aqueous solution of the filtration resistive agent with mixing. The slurry was deposited on the substrate A under the film deposition conditions listed in Table 2, and the deposition film was converted into a filter by firing at 1400° C. for 1 hour. Uniformity of the membrane was assessed by the same method as in Example 1. The results are shown in TABLE 2.

TABLE 2

| | COMPOSITION OF SLURRY FOR FILM DEPOSITION | | | | | FILM DEPOSITION CONDITION | | | EVALUATION OF FILTER | | | |
|---|---|---|---|---|---|---|---|---|---|---|---|---|
| | FRAMEWORK PARTICLES | | | | | | | | | | | |
| (unit) | KIND | PARTICLE SIZE μM | CONC. WT % | RESISTIVE AGENT | FRAME/ RESIS. AGENT RATIO WT/WT | DIFF. FILT. PRESSURE KGF/CM$^2$ | FILM SURFACE LINEAR RATE M/SEC | DIFF. PRESS./ LINEAR VELOCITY RATIO | CRITICAL FILM THICKNESS μM | DEPOSIT FILM THICKNESS μM | STANDARD DEVIATION % | UNIFORMITY OF FILM THICKNESS |
| EXAMPLE 2-3 | AL | 8 | 15 | (1) | 20 | 1 | 0.133 | 7.52 | 80 | 80 | 6 | GOOD |
| EXAMPLE 2-4 | AL | 8 | 15 | (1) | 40 | 1 | 0.133 | 7.52 | 140 | 140 | 8 | GOOD |
| EXAMPLE 2-1 | AL | 8 | 15 | (1) | 70 | 1 | 0.133 | 7.52 | 250 | 250 | 10 | GOOD |
| EXAMPLE 2-5 | AL | 8 | 15 | (1) | 100 | 1 | 0.133 | 7.52 | 360 | 360 | 14 | GOOD |
| EXAMPLE 2-6 | AL | 8 | 15 | (1) | 200 | 1 | 0.133 | 7.52 | 700 | 700 | 20 | GOOD |
| COMPARATIVE EXAMPLE 2-2 | AL | 8 | 15 | (1) | 300 | 1 | 0.133 | 7.52 | 1100 | 1100 | 45 | POOR |

TABLE 2-continued

| | COMPOSITION OF SLURRY FOR FILM DEPOSITION | | | | | FILM DEPOSITION CONDITION | | | EVALUATION OF FILTER | | | |
|---|---|---|---|---|---|---|---|---|---|---|---|---|
| | FRAMEWORK PARTICLES | | | | | | | | | | | |
| (unit) | KIND | PARTICLE SIZE $\mu$M | CONC. WT % | RESISTIVE AGENT | FRAME/RESIS. AGENT RATIO WT/WT | DIFF. FILT. PRESSURE $KGF/CM^2$ | FILM SURFACE LINEAR RATE M/SEC | DIFF. PRESS./LINEAR VELOCITY RATIO | CRITICAL FILM THICKNESS $\mu$M | DEPOSIT FILM THICKNESS $\mu$M | STANDARD DEVIATION % | UNIFORMITY OF FILM THICKNESS |
| EXAMPLE 2-16 | AL | 3 | 15 | (2) | 10 | 1 | 0.133 | 7.52 | 50 | 50 | 8 | GOOD |
| EXAMPLE 2-15 | AL | 3 | 15 | (2) | 50 | 1 | 0.133 | 7.52 | 180 | 180 | 8 | GOOD |
| EXAMPLE 2-14 | AL | 3 | 15 | (2) | 100 | 1 | 0.133 | 7.52 | 380 | 380 | 13 | GOOD |
| EXAMPLE 2-7 | AL | 8 | 15 | (1) | 70 | 0.5 | 0.133 | 3.76 | 140 | 140 | 9 | GOOD |
| EXAMPLE 2-8 | AL | 8 | 15 | (1) | 70 | 2 | 0.133 | 15.0 | 500 | 500 | 11 | GOOD |
| EXAMPLE 2-9 | AL | 8 | 15 | (1) | 70 | 1 | 0.065 | 15.4 | 450 | 450 | 10 | GOOD |
| EXAMPLE 2-10 | AL | 8 | 15 | (1) | 70 | 1 | 0.266 | 3.76 | 130 | 130 | 11 | GOOD |
| EXAMPLE 2-11 | AL | 8 | 5 | (1) | 70 | 1 | 0.133 | 7.52 | 250 | 250 | 7 | GOOD |
| EXAMPLE 2-12 | AL | 8 | 30 | (1) | 70 | 1 | 0.133 | 7.52 | 250 | 250 | 13 | GOOD |
| EXAMPLE 2-13 | AL | 3 | 15 | (1) | 70 | 1 | 0.133 | 7.52 | 250 | 250 | 9 | GOOD |
| EXAMPLE 2-2 | AL | 8 | 15 | (1) | 70 | 1 | 0.133 | 7.52 | 250 | 125 | 19 | GOOD |
| COMPARATIVE EXAMPLE 2-1 | AL | 8 | 15 | (1) | 70 | 1 | 0.133 | 7.52 | 250 | 80 | 25 | POOR |

AL: ALUMINA
(1) WELAN GUM
(2) AGAR PREPARATION

In Examples 2-1 and 2-3 to 2-6, the effects of controlling the film thickness were investigated by changing the composition of the film deposition slurry, while the film deposition conditions were fixed. The results showed the film thickness could be controlled by varying the critical film thickness depending on the weight ratio between the framework particles and the filtration resistive agent (referred to as frame/resistive agent ratio hereinafter).

The thickness of the porous membrane formed when the frame/resistive agent ratio was within a range of 20 to 200 showed a standard deviation within 20%, resulting in a uniform film thickness.

In addition, the smaller frame/resistive agent ratio (or a larger amount of addition of the filtration resistive agent) improved uniformity of the film thickness, even when the frame/resistive agent ratio is within the range of 20 to 200. When the frame/resistive agent ratio is large (or a smaller amount of the filtration resistive agent is added) even in the presence of the filtration resistive agent as shown in Comparative Example 2-2, uniform film thickness could not be obtained.

While welan gum was used in Examples 2-1, and 2-3 to 2-6 as the filtration resistive agent, it was also possible to control the uniformity of the film thickness, by changing the frame/resistive agent ratio using the agar preparation (Examples 2-14 to 2-16).

The effect of controlling the film thickness by varying the film deposition conditions was investigated in Examples 2-7 to 2-10, while fixing the slurry composition. The results showed that the critical film thickness changes in accordance with the ratio between the differential filtration pressure and linear film surface velocity (referred to as the differential filtration pressure/linear film surface velocity ratio hereinafter) to control film thickness.

The standard deviation of the porous membrane formed film thickness within the differential filtration pressure/linear film surface velocity ratio of 3.76 to 15.4 was within 20%, indicating uniformity.

The differential filtration pressure/linear film surface velocity ratio can be controlled by merely changing the differential filtration pressure as in Examples 2-7 and 2-8, by merely changing the linear film surface velocity as in Examples 2-9 and 2-1, or by changing both of the differential filtration pressure and the linear film surface velocity.

As shown in examples 2-1, and 2-3 to 2-10, the critical film thickness can be controlled only by changing the frame/resistive agent ratio, the differential filtration pressure/linear film surface velocity ratio, or both of them. Accordingly, the critical film thickness could not be controlled by changing the concentration of the framework particles in the slurry (Examples 2-11 and 2-12) or the particle size of the framework particles (Example 2-13), so long as the frame/resistive agent ratio and the differential filtration pressure/linear film surface velocity ratio are constant.

Depositing the film up to the critical thickness was not necessarily required to achieve uniform film thickness as shown in Example 2-2. For example, the film thickness was uniform at 50% or more of the critical thickness as shown in Example 2-2. However, the film thickness could not be made to be uniform at a thickness of less than 50% of the critical thickness as shown in Example 2-1.

EXAMPLE 3

The filtration resistive agent for the low sintering temperature slurry containing the binder was screened in Example 3. The film deposition slurries listed in Table 3 were prepared by adding zirconium oxychloride as a binder and framework particles into an aqueous solution of the filtration resistive agent. The concentration of the framework particles in the slurry was 175 by weight, and the substrate A described above was used. The firing temperature was 550° C. and the firing time was 4 hours.

Stability of the slurry was judged to be good when the framework particles did not aggregate, and the membrane was evenly deposited on the substrate without leaving portions of the substrate uncovered, and stability of the slurry was judged to be poor when the slurry could not be prepared, or when some portions on the substrate remained uncovered.

Uniformity of the film thickness was assessed using the same method as in Example 1. To evaluate film strength, the deposition film was washed from the reverse direction 100 times under a differential pressure between the upper face and lower face of the membrane of 5 kg/cm$^{2.}$ The strength was evaluated to be good when the water permeation rate and the maximum micro-pore size did not change before and after the reversed washing, and to be poor when some changes were observed.

TABLE 3

| | CONCENTRATION OF SLURRY FOR FILM DEPOSITION | | | | | EVALUATION OF FILTRATION RESISTIVE AGENT | | |
|---|---|---|---|---|---|---|---|---|
| | FRAMEWORK PARTICLES | | | | | | | |
| (UNIT) | KIND | PARTICLE SIZE μM | CONCENTRATION WT % | KIND OF RESISTIVE AGENT | FRAME/RESISTIVE AGENT RATIO WT/WT | STABILITY OF SLURRY | UNIFORMITY OF FILM THICKNESS | FILM STRENGTH |
| EXAMPLE 3-1 | ALUMINA | 3 | 17 | CHITOSAN | 20 | GOOD | GOOD | GOOD |
| EXAMPLE 3-2 | ALUMINA | 3 | 17 | AGAR | 50 | GOOD | GOOD | GOOD |
| EXAMPLE 3-3 | ALUMINA | 3 | 17 | AGAR PREPARATION | 60 | GOOD | GOOD | GOOD |
| EXAMPLE 3-4 | ALUMINA | 3 | 17 | WELAN GUM | 30 | GOOD | GOOD | GOOD |
| COMPARATIVE EXAMPLE 3-1 | ALUMINA | 3 | 17 | PVP | 30 | GOOD | POOR | POOR |
| COMPARATIVE EXAMPLE 3-1 | ALUMINA | 3 | 17 | ACRYLIC RESIN | 100 | POOR | — | — |

*PVP in the table means polyvinyl piridine (Results)

Figure 3:
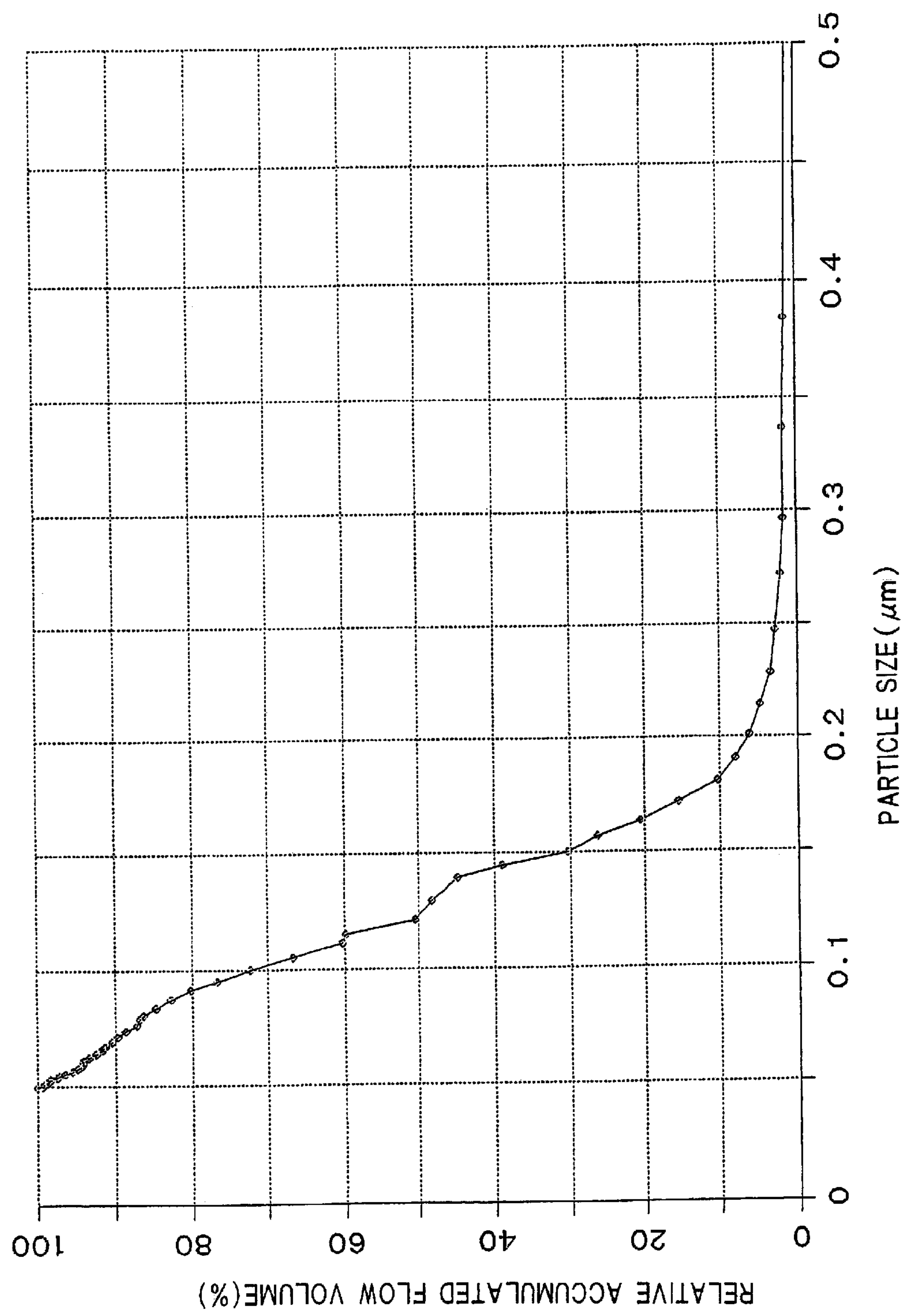
FIG. 3 is a graph showing the micro-pore size distribution of the porous membrane formed on the ceramic filter according to Comparative Example 5-3.

As shown in FIG. 3, good results on the stability of the slurry, acid resistance, uniformity of the film thickness and strength of the film were obtained using polysaccharide resistive agents such as chitosan, agar, agar mixture and welan gum (examples 3-1 to 3-4).

Although polyvinyl pyridine provided good slurry stability, some problems arose in the uniformity of and strength of the film (Comparative Example 3-1). Further, stability of the slurry was a problem when acrylic resin was used, since the acrylic resin itself aggregated to form precipitates even when it was added dropwise with mixing.

EXAMPLE 4

The low temperature firing slurry containing zirconium oxychloride as a binder and various kinds and concentrations of the framework particles was deposited as a film, and uniformity of the film thickness of the filter obtained by firing the deposited slurry film were investigated. The slurries listed in Table 4 were prepared by adding zirconium oxychloride, and subsequently the framework particles, to an aqueous solution of the filtration resistive agent. The film obtained was fired at 550° C. for 4 hours.

Uniformity of the film thickness was assessed by the same method as in Example 1. The slurry prepared was subjected to film deposition with a given time interval, and the time after which film thickness uniformity had been lost is listed in the table as the stabilizing time. The results are shown in Table 4.

TABLE 4

| (UNIT) | SUBSTRATE | SLURRY COMPOSITION: FRAMEWORK PARTICLES KIND | PARTICLE SIZE μM | CONC. WT % | BINDER CONC. WT % | KIND OF RESISTIVE AGENT | FRAMEWORK/RESISTIVE AGENT RATION WT/WT | EVALUATION: SLURRY STABILIZING TIME | UNIFORMITY OF FILM THICKNESS |
|---|---|---|---|---|---|---|---|---|---|
| EXAMPLE 4-1 | A | ALUMINA | 3 | 17 | 18 | WELAN GUM | 34 | 3 DAYS OR MORE | GOOD |
| EXAMPLE 4-2 | A | ALUMINA | 3 | 17 | 18 | WELAN GUM | 17 | 3 DAYS OR MORE | GOOD |
| EXAMPLE 4-3 | B | ALUMINA | 1 | 17 | 15 | WELAN GUM | 20 | 3 DAYS OR MORE | GOOD |
| EXAMPLE 4-4 | B | ALUMINA | 0.3 | 17 | 9 | WELAN GUM | 2.1 | 3 DAYS OR MORE | GOOD |
| EXAMPLE 4-5 | A | ALUMINA | 3 | 17 | 18 | AGAR PREPARATION | 17 | 6 HOURS | POOR |
| EXAMPLE 4-6 | B | ALUMINA | 0.3 | 17 | 10 | AGAR | 40 | 4 HOURE | — |

As shown in Examples 4-1 to 4-6, stable film deposition slurries could be prepared irrespective of the particle size of the framework particles, concentration of the framework particles, weight ratio between the framework particles and the filtration resistive agent, and concentration of the filtration resistive agent, thereby permitting uniform thickness of the porous membrane.

However, the effectiveness of the agar preparation and the agar was reduced after standing for 6 hours and 4 hours, respectively. In contrast, welan gum having a high acidity made the slurry stable for more than 3 days, and enabled a uniform film to be deposited. This means that welan gum exhibited good characteristics as a filtration resistive agent for the low temperature firing slurry.

EXAMPLE 5

The effects for smoothing the membrane surface, for reducing the amount of the binder, and for making the micro-pore size distribution sharp were investigated in Example 5 with respect to the low firing temperature slurry containing titania sol particles as a binder, and an acrylic resin as a filtration resistive agent.

Titania sol particles with a particle size of 30 nm were used as the binder. An aqueous solution containing 15% by weight of titania with pH of about one, which was prepared by hydrolysis of titanium isopropoxide, was used.

The particle size of the sol particles was measured with a transmission type electron microscope, and the mean value between the maximum and minimum particle size, or the mean value of the particle sizes among 100 particles, was used as the particle size.

A powder of alumina or mullite was used as the framework particles, and an acrylic resin Aron AS-7503 (trade name; made by Toa Synthetic Chemicals, Co.) was used as the filtration resistive agent. The slurry was prepared according to the following procedure.

A mixed solution was prepared by adding an aqueous solution of 0.1 to 1% by weight of acrylic resin dropwise into an aqueous solution of 15% by weight of titania sol, and an alumina slurry was separately prepared by suspending an alumina powder in water with a solid fraction concentration of 50% by weight and adjusted to pH 2 with 60% by weight of nitric acid. The alumina slurry was added into the mixed solution dropwise and, after mixing with a stirrer for 1 hour, the film deposition slurries listed in Table 5 were prepared. The concentration of the framework particles was 3% by weight.

Deposition films were prepared using the filtration deposition method and the slurries prepared as described above, and the filters were obtained by firing the deposition film at 600° for 4 hours.

The film thickness and smoothness of the membrane surface were evaluated by observing the cross section of the porous membrane using a scanning electron microscope so that the membrane length corresponding to 50 μm falls within one field of view. The film thickness was determined to be a mean value of the film thickness measured with respect to 100 fields of view, and the membrane surface having a maximum height difference between convex portions and concave portions of 5 μm was assessed to be poor in surface smoothness.

To evaluate film adhesive strength, a transparent adhesive tape was adhered on the porous membrane of the filter. After peeling the tape, the adhesive strength was evaluated to be good when no porous membrane was peeled off at all, and was evaluated to be poor when a part of the membrane surface was peeled off. The micro-pore size distribution was measured according to the air-flow method per ASTM F306, and water permeation rate was assessed from the water permeation rate per unit filtration area and unit time under a differential pressure between the upper face and lower face of the filter of 1 kg/cm$^2$ at a temperature of 25° C. The results are shown in Table 5.

TABLE 5

| | COMPOSITION OF SLURRY FOR FILM DEPOSITION | | | | EVALUATION OF FILTER | | | | |
|---|---|---|---|---|---|---|---|---|---|
| | FRAME-WORK PARTI-CLE | FRAME-WORK PARTICLE SIZE (μM) | CONC. OF BINDER (WT %) | CONC. OF RESISTIVE AGENT (WT %) | FILM THICK-NESS (μM) | FILM ADHESIVE STRENGTH | SMOOTHNESS OF FILM SURFACE | MEAN MICRO-PORE SIZE (μM) | WATER PERMEATION RATE ($M^3/M^2$/DAY) |
| COMPARATIVE EXAMPLE 5-1 | ALUMINA | 0.5 | 5 | 0 | 10 | POOR | POOR | 0.15 | 10 |
| COMPARATIVE EXAMPLE 5-2 | ALUMINA | 0.5 | 7 | 0 | 10 | GOOD | POOR | 0.15 | 8 |
| COMPARATIVE EXAMPLE 5-3 | ALUMINA | 0.3 | 7 | 0 | 10 | GOOD | POOR | 0.13 | 22 |
| EXAMPLE 5-1 | ALUMINA | 0.5 | 0.1 | 0.12 | 15 | POOR | GOOD | 0.16 | 25 |
| EXAMPLE 5-2 | ALUMINA | 0.5 | 0.2 | 0.12 | 15 | GOOD | GOOD | 0.16 | 20 |
| EXAMPLE 5-3 | ALUMINA | 0.5 | 0.5 | 0.12 | 15 | GOOD | GOOD | 0.16 | 18 |
| EXAMPLE 5-4 | ALUMINA | 0.5 | 1.0 | 0.12 | 15 | GOOD | GOOD | 0.16 | 15 |
| EXAMPLE 5-5 | ALUMINA | 0.5 | 1.2 | 0.12 | 15 | GOOD | GOOD | (CRACKS) | — |
| EXAMPLE 5-6 | ALUMINA | 0.3 | 0.6 | 0.12 | 15 | GOOD | GOOD | 0.12 | 20 |
| EXAMPLE 5-7 | MULLITE | 0.3 | 0.6 | 0.12 | 20 | GOOD | GOOD | 0.12 | 19 |

(Results)

As shown in Table 1, when no filtration resistive agent was added, the membrane surface was rough and failed to obtain enough adhesive strength to endure the peeling test (Comparative example 5-1). Although a high adhesive strength could be obtained by adding 7% by weight or more of the binder (titania), a smooth membrane surface could not be obtained without remaining rough portions on the surface (Comparative Examples 5-2 and 5-3). Furthermore, the water permeation rate of the filter was as low as 8 $m^3/m^2$/day in Comparative Example 5-2.

On the other hand, when the filtration resistive agent was added, the filter generally showed good characteristics. The effects of the concentration of the binder (titania) was evaluated in Examples 5-1 to 5-5. Although the results were generally good, the water permeation rate of the filter showed a decreasing tendency as the concentration of the binder is higher. When the concentration of the binder is too low, a high adhesive strength of the membrane could not obtained (Example 5-1), and cracks are generated in the filter when the concentration is too high (Example 5-5).

FIGS. 1(*a*) and 1(*b*) show the photographs of the micro-structures taken with a scanning electron microscope (SEM) in the vicinity of the porous membrane of the filter in Example 5-6 and Comparative Example 5-3 according to the present invention.

The photographs show that the film thickness of the porous membrane on the surface of the substrate is uniform in the filter in the Example 5-3 (FIG. 1(*a*)), and that the smoothness of the membrane surface was considerably improved as compared with the filter in Comparative Example 5-3 (FIG. 1(*b*)).

Figure 2:
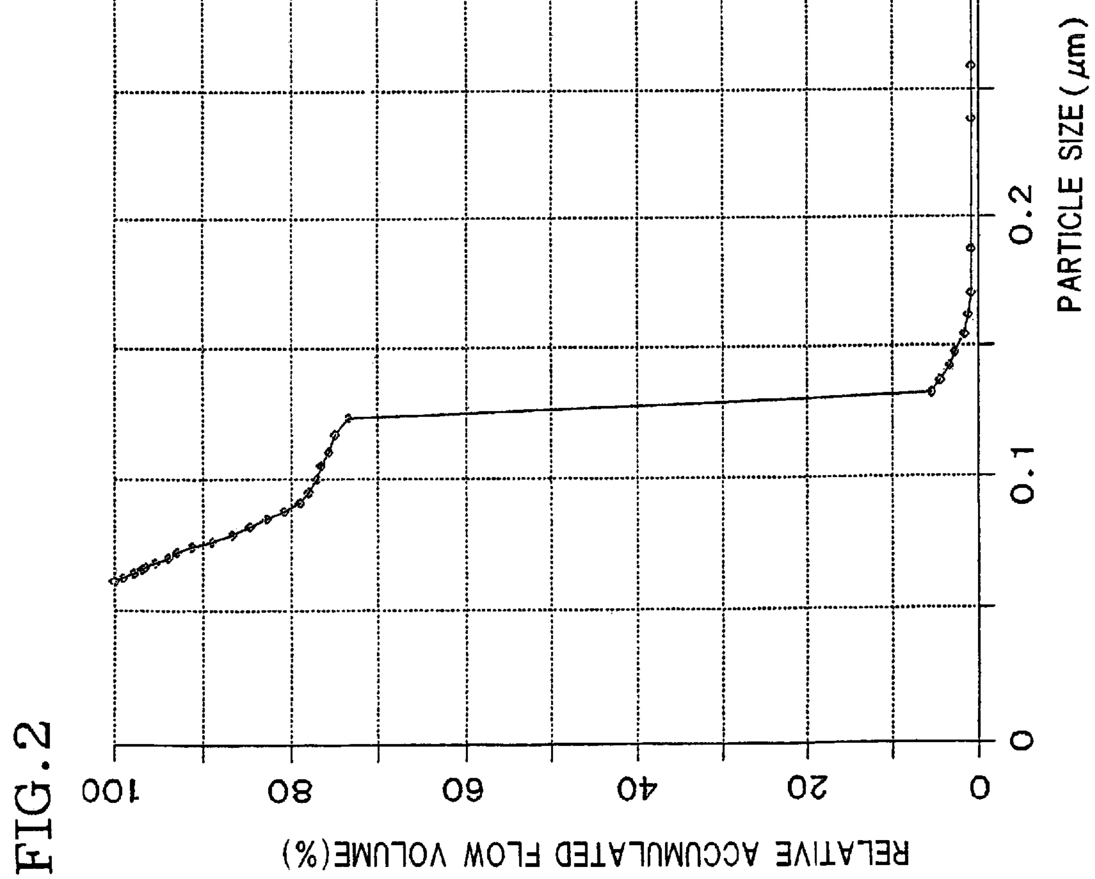
FIG. 2 is a graph showing the micro-pore size distribution of the porous membrane formed on the ceramic filter according to Example 5-6.

As is evident from the graphs of the micro-pore size distribution shown in FIGS. 2 and 3, the filter in Example 5-6 (FIG. 2) has a uniform micro-pore size with a sharp micro-pore size distribution as compared with the filter in Comparative Example 5-3 (FIG. 3).

Industrial Applicability

According to the present invention described herein, a porous membrane with a uniform and smooth film thickness, as well as a sharp micro-pore size distribution, can be formed. The method according to the present invention is particularly excellent in that the slurry can be deposited in the through-hole with a uniform film thickness in the long size substrate and revolver magazine type substrate.

According to the present invention, it is also possible to deposit the slurry by controlling the deposition film to be a desired thickness, and by reducing the binder used for the low temperature firing method.

What is claimed is:

1. A method of manufacturing a filter utilizing a ceramic porous membrane as a separation film, comprising the steps of:

vertically disposing a porous substrate having a lower end and an upper end;

substituting air in fine pores of the porous substrate with a liquid;

isolating a first face of the porous substrate on which a separation film is to be provided from a second opposed face on which a separation film is not provided so as to enable a pressure differential between said first and said second faces of the porous substrate;

continuously feeding a film deposition slurry comprising ceramic framework particles to allow the slurry to contact said first face of the porous substrate;

applying a differential filtration pressure between said first and said second faces of the porous substrate; and depositing the slurry on said first face of the porous substrate;

wherein an organic polymer is added to the slurry in an amount sufficient to prevent a pressure differential in the slurry opposing said first face of the porous substrate between positions adjacent said upper and lower ends of the porous substrate, said organic polymer comprising at least one material selected from the group consisting of welan gum, agar, starch and gelatin.

2. The method of claim 1, wherein the porous substrate comprises a cylindrical porous substrate having a single or a plurality of through-holes formed along a longitudinal direction thereof, said method further comprising the steps of:

isolating an inner side of the single or plurality of through-holes in the porous substrate on which a separation film is to be provided from an outer circumferential surface of the porous substrate on which a separation film is not provided;

continuously feeding the film deposition slurry into the single or plurality of through-holes to allow the slurry to contact an inner wall of said inner side of the single or plurality of through-holes;

applying a differential filtration pressure between said inner side of the single or plurality of through-holes of the porous substrate and said outer circumferential surface of the porous substrate; and depositing the slurry on said inner side of the single or plurality of through-holes of the porous substrate.

3. The method of claim 1, wherein the thickness of the separation film deposited on said first face of the porous substrate is at least 50% of a critical thickness.

4. The method of claim 1, wherein said liquid for substituting air inside the fine pores of the porous substrate consists of water.

5. A method for manufacturing a filter utilizing a ceramic porous membrane as a separation film, comprising the steps of:

providing a cylindrical porous substrate having a plurality of through-holes formed along a longitudinal direction thereof, said plurality of through-holes including at least a first through-hole positioned proximate the center of the cylindrical porous substrate and at least a second through-hole positioned proximate the outer circumferential surface of the cylindrical porus substrate;

substituting air in fine pores of the cylindical porous substrate with a liquid;

isolating an inner side of the plurality of through-holes in the cylindrical porous substrate on which a separation film is to be provided from the outer circumferential surface of the cylindrical porous substrate on which a separation film is not provided;

continuously feeding the film deposition slurry into the plurality of through-holes to allow the slurry to contact an inner wall of said inner side of the plurality of through-holes;

applying a differential filtration pressure between said inner side of the plurality of through-holes of the cylindrical porous substrate and said outer circumferential surface of the cylindrical porous substrate; and depositing the slurry on said inner side of the plurality of through-holes of the cylidrical porous substrate;

wherein an organic polymer is added to the slurry in an amount sufficient to prevent a pressure differential in the slurry between positions adjacent the inner wall of said inner side of said first through-hole and the inner wall of said inner side of said second tbrough-hole, said organic polymer comprising at least one material selected from the group consisting of welan gum, agar, starch and gelatin.

6. The method of claim 5, wherein the thickness of the separation film deposited on said inner wall of said inner side of the plurality of through-holes of the cylindrical porous substrate is at least 50% of a critical thickness.

7. The method of claim 5, wherein said liquid for substituting air inside the fine pores of the cylindrical porous substrate consists of water.

* * * * *